(12) United States Patent
Hefetz et al.

(10) Patent No.: US 11,308,477 B2
(45) Date of Patent: *Apr. 19, 2022

(54) METHOD OF REDUCING FRAUD IN ON-LINE TRANSACTIONS

(71) Applicant: SPRIV LLC, New York, NY (US)

(72) Inventors: Guy Hefetz, Boca Raton, FL (US); Jaqcob Heffez, Arlington, VA (US); Christopher Donald Wood, Arlington, VA (US)

(73) Assignee: Spriv LLC, New York, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/724,361

(22) Filed: Dec. 22, 2019

(65) Prior Publication Data
US 2020/0126060 A1     Apr. 23, 2020

Related U.S. Application Data

(63) Continuation-in-part of application No. 15/787,805, filed on Oct. 19, 2017, now Pat. No. 10,521,786, (Continued)

(51) Int. Cl.
*G06K 5/00* (2006.01)
*G06Q 20/32* (2012.01)
*G06Q 20/40* (2012.01)

(52) U.S. Cl.
CPC ..... *G06Q 20/3224* (2013.01); *G06Q 20/4012* (2013.01); *G06Q 20/4016* (2013.01)

(58) Field of Classification Search
CPC ..... G06Q 20/20; G07G 1/0036; G07G 1/0081
(Continued)

(56) References Cited

U.S. PATENT DOCUMENTS

| 5,327,144 A | 7/1994 | Stilp et al. |
| 5,754,657 A | 5/1998 | Schipper et al. |

(Continued)

FOREIGN PATENT DOCUMENTS

| EP | 1459365 A2 | 9/2004 |
| EP | 1469368 A1 | 10/2004 |

(Continued)

OTHER PUBLICATIONS

K. Charlton, N. Taylor, "Online Credit Card Fraud against Small Businesses", Australian Institute of Criminology, Research and Public Policy Series, No. 60; pp. 14-20.

(Continued)

*Primary Examiner* — Daniel St. Cyr
(74) *Attorney, Agent, or Firm* — James P. Demers; Cittone Demers & Ameri LLP

(57) ABSTRACT

The invention provides a method for verifying the identity of an internet user, or for detecting the misuse of an identity, during an on-line transaction. The method involves comparing the geographic location of the transaction to the geographic location of the user's cell phone or other mobile device, and taking a geographically close location relationship between the two as a positive indication of identity. A reasonable travel time between the two locations can be taken into account so as to reduce the incidence of false negatives, and to improve the reliability of positive identifications.

19 Claims, 4 Drawing Sheets

Related U.S. Application Data which is a continuation-in-part of application No. 15/606,270, filed on May 26, 2017, now Pat. No. 10,289,833, which is a continuation-in-part of application No. 15/134,545, filed on Apr. 21, 2016, now Pat. No. 9,727,867, which is a continuation-in-part of application No. 14/835,707, filed on Aug. 25, 2015, now Pat. No. 9,391,985, which is a continuation-in-part of application No. 14/479,266, filed on Sep. 5, 2014, now abandoned, which is a continuation-in-part of application No. 14/145,862, filed on Dec. 31, 2013, now Pat. No. 9,033,225, which is a continuation-in-part of application No. 13/479,235, filed on May 23, 2012, now Pat. No. 8,770,477, which is a continuation-in-part of application No. 13/065,691, filed on Mar. 28, 2011, now Pat. No. 8,640,197, and a continuation-in-part of application No. 12/357,380, filed on Jan. 21, 2009, now Pat. No. 8,656,458, which is a continuation-in-part of application No. 12/260,065, filed on Oct. 28, 2008, now abandoned, which is a continuation-in-part of application No. 11/405,789, filed on Apr. 18, 2006, now Pat. No. 8,590,007, which is a continuation-in-part of application No. 11/346,240, filed on Feb. 3, 2006, now Pat. No. 7,503,489.

(60) Provisional application No. 61/318,329, filed on Mar. 28, 2010, provisional application No. 60/711,346, filed on Aug. 25, 2005, provisional application No. 60/674,709, filed on Apr. 26, 2005.

(58) Field of Classification Search
USPC ...... 235/382, 380, 383; 726/2–5; 705/64, 67
See application file for complete search history.

(56) References Cited

U.S. PATENT DOCUMENTS

| | | | |
|---|---|---|---|
| 5,757,916 A | 5/1998 | MacDoran et al. | |
| 5,790,074 A | 8/1998 | Rangedahl et al. | |
| 5,945,944 A | 8/1999 | Krasner | |
| 6,012,144 A | 1/2000 | Pickett | |
| 6,097,938 A | 8/2000 | Paxson | |
| 6,236,365 B1 | 5/2001 | LeBlanc et al. | |
| 6,466,779 B1 | 10/2002 | Moles et al. | |
| 6,612,488 B2 * | 9/2003 | Suzuki | G06Q 20/40 235/380 |
| 6,625,456 B1 | 9/2003 | Busso et al. | |
| 6,882,313 B1 | 4/2005 | Fan et al. | |
| 6,975,941 B1 * | 12/2005 | Lau | G01C 21/00 340/539.13 |
| 6,978,023 B2 | 12/2005 | Dacosta | |
| 7,013,149 B2 | 3/2006 | Vetro et al. | |
| 7,080,402 B2 | 7/2006 | Bates | |
| 7,212,806 B2 | 5/2007 | Karaoguz | |
| 7,305,245 B2 | 12/2007 | Alizadeh-Shabdiz et al. | |
| 7,321,775 B2 | 1/2008 | Maanoja | |
| 7,376,431 B2 | 5/2008 | Niedermeyer | |
| 7,418,267 B2 | 8/2008 | Karaoguz | |
| 7,450,930 B2 | 11/2008 | Williams et al. | |
| 7,497,374 B2 | 3/2009 | Helsper et al. | |
| 7,503,489 B2 | 3/2009 | Heffez et al. | |
| 7,577,665 B2 | 8/2009 | Ramer et al. | |
| 7,591,020 B2 | 9/2009 | Kammer et al. | |
| 7,594,605 B2 | 9/2009 | Aaron et al. | |
| 7,598,855 B2 | 10/2009 | Scalisi et al. | |
| 7,647,164 B2 | 1/2010 | Reevs | |
| 7,669,759 B1 | 3/2010 | Zettner | |
| 7,673,032 B1 | 3/2010 | Augart | |
| 7,673,793 B2 | 3/2010 | Greene | |
| 7,751,829 B2 | 7/2010 | Masuoka et al. | |
| 7,764,231 B1 | 7/2010 | Karr et al. | |
| 7,769,396 B2 | 8/2010 | Alizadeh-Shabdiz et al. | |
| 7,788,134 B1 | 8/2010 | Manber et al. | |
| 7,832,636 B2 | 11/2010 | Heffez et al. | |
| 7,848,760 B2 | 12/2010 | Caspi et al. | |
| 7,865,181 B1 | 1/2011 | Macaluso | |
| 7,907,529 B2 | 3/2011 | Wisely et al. | |
| 7,908,645 B2 | 3/2011 | Varghese et al. | |
| 8,006,190 B2 | 8/2011 | Quoc et al. | |
| 8,285,639 B2 | 10/2012 | Eden et al. | |
| 8,295,898 B2 | 10/2012 | Ashfield et al. | |
| 8,321,913 B2 | 11/2012 | Turnbull et al. | |
| 8,370,909 B2 * | 2/2013 | Heffez | H04L 63/107 705/14.23 |
| 8,374,634 B2 | 2/2013 | Dankar et al. | |
| 8,572,391 B2 | 10/2013 | Golan et al. | |
| 8,606,299 B2 | 12/2013 | Fok et al. | |
| 8,611,919 B2 | 12/2013 | Barnes, Jr. | |
| 8,640,197 B2 | 1/2014 | Heffez | |
| 8,668,568 B2 | 3/2014 | Denker et al. | |
| 8,676,684 B2 | 3/2014 | Newman et al. | |
| 8,770,477 B2 | 7/2014 | Hefetz | |
| 8,793,776 B1 | 7/2014 | Jackson | |
| 8,904,496 B1 | 12/2014 | Bailey et al. | |
| 9,014,666 B2 | 4/2015 | Bentley et al. | |
| 9,033,225 B2 | 5/2015 | Hefetz | |
| 9,391,985 B2 | 7/2016 | Hefetz | |
| 9,727,867 B2 | 8/2017 | Heffez et al. | |
| 10,289,833 B2 * | 5/2019 | Hefetz | G06Q 20/4014 |
| 10,521,786 B2 * | 12/2019 | Hefetz | H04W 4/023 |
| 10,552,583 B2 | 2/2020 | Piccionelli et al. | |
| 10,554,645 B2 | 2/2020 | Hefetz | |
| 10,645,072 B2 | 5/2020 | Heffez et al. | |
| 2001/0034718 A1 | 10/2001 | Shaked et al. | |
| 2002/0016831 A1 | 2/2002 | Peled et al. | |
| 2002/0019699 A1 | 2/2002 | McCarty et al. | |
| 2002/0035622 A1 * | 3/2002 | Barber | G06Q 10/00 709/220 |
| 2002/0053018 A1 | 5/2002 | Ota et al. | |
| 2002/0073044 A1 | 6/2002 | Singhal | |
| 2002/0089960 A1 | 7/2002 | Shuster | |
| 2002/0188712 A1 | 12/2002 | Caslin et al. | |
| 2003/0009594 A1 | 1/2003 | McElligott | |
| 2003/0056096 A1 | 3/2003 | Albert et al. | |
| 2003/0061163 A1 | 3/2003 | Durfield | |
| 2003/0101134 A1 | 5/2003 | Liu et al. | |
| 2003/0134648 A1 | 7/2003 | Reed et al. | |
| 2003/0135463 A1 | 7/2003 | Brown et al. | |
| 2003/0144952 A1 | 7/2003 | Brown et al. | |
| 2003/0187800 A1 | 10/2003 | Moore et al. | |
| 2003/0190921 A1 | 10/2003 | Stewart | |
| 2004/0073519 A1 | 4/2004 | Fast | |
| 2004/0081109 A1 | 4/2004 | Oishi | |
| 2004/0088551 A1 | 5/2004 | Dor et al. | |
| 2004/0111640 A1 | 6/2004 | Baum | |
| 2004/0219904 A1 | 11/2004 | De Petris | |
| 2004/0234117 A1 | 11/2004 | Tibor | |
| 2004/0242201 A1 | 12/2004 | Sasakura et al. | |
| 2004/0254868 A1 | 12/2004 | Kirkland et al. | |
| 2004/0259572 A1 | 12/2004 | Aoki et al. | |
| 2005/0021738 A1 | 1/2005 | Goeller et al. | |
| 2005/0022119 A1 | 1/2005 | Kraemer | |
| 2005/0027543 A1 | 2/2005 | Yannis | |
| 2005/0027667 A1 | 2/2005 | Kroll | |
| 2005/0065875 A1 | 3/2005 | Beard | |
| 2005/0066179 A1 | 3/2005 | Seidlein | |
| 2005/0075985 A1 | 4/2005 | Cartmell | |
| 2005/0086164 A1 | 4/2005 | Kim et al. | |
| 2005/0143916 A1 | 6/2005 | Kim et al. | |
| 2005/0159173 A1 | 7/2005 | Dowling | |
| 2005/0160280 A1 | 7/2005 | Caslin et al. | |
| 2005/0180395 A1 | 8/2005 | Moore et al. | |
| 2005/0198218 A1 | 9/2005 | Tasker et al. | |
| 2006/0031830 A1 | 2/2006 | Chu et al. | |
| 2006/0064374 A1 | 3/2006 | Helsper et al. | |
| 2006/0085310 A1 | 4/2006 | Mylet et al. | |
| 2006/0085357 A1 | 4/2006 | Pizarro | |
| 2006/0107307 A1 | 5/2006 | Knox et al. | |
| 2006/0128397 A1 | 6/2006 | Choti et al. | |
| 2006/0194592 A1 | 8/2006 | Clough | |
| 2006/0217131 A1 | 9/2006 | Farshid et al. | |

(56) References Cited

U.S. PATENT DOCUMENTS

| | | | |
|---|---|---|---|
| 2006/0277312 A1 | 12/2006 | Hirsch | |
| 2007/0053306 A1 | 3/2007 | Stevens | |
| 2007/0055672 A1 | 3/2007 | Stevens | |
| 2007/0055684 A1 | 3/2007 | Stevens | |
| 2007/0055732 A1 | 3/2007 | Stevens | |
| 2007/0055785 A1 | 3/2007 | Stevens | |
| 2007/0061301 A1 | 3/2007 | Ramer et al. | |
| 2007/0084913 A1 | 4/2007 | Weston | |
| 2007/0133487 A1 | 6/2007 | Wang et al. | |
| 2007/0136573 A1 | 6/2007 | Steinberg | |
| 2008/0046367 A1 | 2/2008 | Billmaier et al. | |
| 2008/0046988 A1 | 2/2008 | Baharis et al. | |
| 2008/0132170 A1 | 6/2008 | Farshid et al. | |
| 2008/0146193 A1* | 6/2008 | Bentley | G06F 21/34 455/411 |
| 2008/0189776 A1* | 8/2008 | Constable | H04L 12/1822 726/7 |
| 2008/0222038 A1 | 9/2008 | Eden et al. | |
| 2008/0248892 A1 | 10/2008 | Walworth | |
| 2008/0249939 A1 | 10/2008 | Veenstra | |
| 2009/0260075 A1 | 10/2009 | Gedge et al. | |
| 2009/0276321 A1 | 11/2009 | Krikorian et al. | |
| 2010/0051684 A1 | 3/2010 | Powers | |
| 2013/0091544 A1 | 4/2013 | Oberheide et al. | |
| 2013/0104198 A1 | 4/2013 | Grim | |
| 2013/0197998 A1 | 8/2013 | Buhrmann et al. | |
| 2013/0312078 A1 | 11/2013 | Oberheide et al. | |
| 2014/0068723 A1 | 3/2014 | Grim et al. | |
| 2014/0245379 A1 | 8/2014 | Oberheide et al. | |
| 2014/0245389 A1 | 8/2014 | Oberheide et al. | |
| 2014/0245450 A1 | 8/2014 | Oberheide et al. | |
| 2015/0040190 A1 | 2/2015 | Oberheide et al. | |
| 2015/0046989 A1 | 2/2015 | Oberheide et al. | |
| 2015/0046990 A1 | 2/2015 | Oberheide et al. | |
| 2015/0074408 A1 | 3/2015 | Oberheide et al. | |
| 2015/0074644 A1 | 3/2015 | Oberheide et al. | |
| 2015/0161378 A1 | 6/2015 | Oberheide et al. | |

FOREIGN PATENT DOCUMENTS

| | | |
|---|---|---|
| EP | 1696626 A1 | 8/2006 |
| EP | 1708527 A1 | 10/2006 |
| EP | 1875653 A2 | 1/2008 |
| GB | 2383497 B1 | 6/2003 |
| GB | 2402792 A | 12/2004 |
| KR | 1020030043886 A | 6/2003 |
| WO | WO2000075760 A1 | 12/2000 |
| WO | WO2001028272 A1 | 4/2001 |
| WO | WO2001054091 A2 | 7/2001 |
| WO | WO2002093502 A1 | 11/2002 |
| WO | WO2004/079499 A2 | 9/2004 |
| WO | WO04095857 A1 | 11/2004 |
| WO | 2005071988 A1 | 8/2005 |
| WO | WO2007004224 A1 | 1/2007 |

OTHER PUBLICATIONS

"Location-based authentication: grounding cyberspace for better security", Computer Fraud and Security, Oxford, GB, (Feb. 1, 1996) XP-002117683.

International Journal of Computer Theory and Engineering vol. 4, No. 2, Apr. 2012: Authentication System Using Location Information on iPad or Smartphone. Hideyuki Takamizawa and Noriko Tanaka.

Terry Sweeney; SIS Taps Mobiles to Reduce Credit Fraud; Mar. 5, 2008 05:09 PM; paragraphs 1 2 and 3.

Security System Matches Card Purchase to Cellphone Location. ePaynews, the Payment News and Resource Center.

Simon G. M. Koo, Catherine Rosenberg, Hoi-Ho Chan, and Yat Chung Lee: "Location-based E-campus Web Services: From Design to Deployment" 2003. School of Electrical and Computer Engineering and Center for Wireless Systems and Applications, Purdue University, West Lafayette, IN 47907-1285, pp. 4, 5, 7.

Shashwat V. Bhavsar: "Wireless Application Environments and Location-Aware Push Services" Dec. 2005; University of New Brunswick. pp. 119, 123, 138-142, 150, 152, 153.

Paul C. Van Oorschot, S. Stubblebine: "Countering Identity Theft through Digital Uniqueness, Location Cross-Checking, and Funneling" Feb. 28-Mar. 3, 2005 Financial Cryptography and Data Security 9th International Conference, FC 2005 Roseau, The Commonwealth of Dominica. pp. 3, 6, 7, 11-13.

Newbury Networks WiFi Workplace http://www.newburynetworks.com/downloads/WiFiWorkpl%D7ace.pdf via archive.com Jun. 19, 2004: Enterprise WLAN Management & Security 2004; pp. 3, 4.

Thomas Mundt: "Two Methods of Authenticated Positioning." Oct. 2, 2006; University of Rostock Institute of Computer Science. pp. 1, 3, 4.

Bill N. Schilit, Anthony Lamarca, Gaetano Borriello, William G. Griswold, David McDonald, Edward Lazowska, Anand Balachandran, Jason Hong and Vaughn Iverson. "Ubiquitous Location-Aware Computing and the "Place Lab" Initiative." Sep. 19, 2003. p. 2.

Sybren A. Stuvel: "Sadako—Securing a building using IEEE 802.11" Jun. 16, 2006; Universiteit van Amsterdam; p. 7.

RSA Adaptive Authentication for Web; https://web.archive.org/web/20061230232715/http://www.rsasecurity.com/node.asp?id=3018 (Archived Dec. 30, 2006).

Cyota eSphinx—How does it work? https://web.archive.org/web/20060324224711/http://www.cyota.com//product_7_19.asp (Archived Mar. 24, 2006).

RSA eFraudNetwork; https://web.archive.org/web/20061210150954/http://www.rsasecurity.com/node.asp?id=3071 (Archived Dec. 10, 2006).

Debopam Acharya, Nitin Prabhu, and Vijay Kumar: "Discovering and Using Web Services in M-Commerce" 2005; SCE, Computer Networking, University of Missouri-Kansas City. Springer-Verlag Berlin Heidelberg 2005. pp. 13-14.

Jeyanthi Hall: "Detection of Rogue Devices in Wireless Networks." Aug. 2006; Ottawa-Carleton Institute for Computer Science, School of Computer Science, Carleton University Ottawa, Ontario; Abstract, pp. 10, 91, 92, 98-100, 143, 203, 205, 208.

Jakob E. Bardram, Rasmus E. Kjær, and Michael Ø. Pedersen: "Context-Aware User Authentication—Supporting Proximity-Based Login in Pervasive Computing" 2003; Springer-Verlag Berlin Heidelberg 2003; Department of Computer Science, University of Aarhus. pp. 111-113, 119.

Frank Adelstein, Prasanth Alla, Rob Joyce and Golden G. Richard III: "Physically Locating Wireless Intruders" 2005; Journal of Universal Computer Science, vol. 11, No. 1 (2005); pp. 3, 4, 5, 6, 14.

thecyberangel.com via Archive.org http://www.thecyberangel.com/pdfs/CyberAngelWhitePaper.pdf: CyberAngel Security Software White Paper. Feb. 17, 2006; pp. 5, 7, 17, 18, 31.

Kenya Nishiki and Erika Tanaka: "Authentication and Access Control Agent Framework for Context-Aware Services." 2005; Systems Development Laboratory, Hitachi, Ltd. Computer Society. pp. 1-4.

Business Wire: "Newbury Networks Introduces RF Firewall for Location-Based Access Control and Policy Enforcement": May 21, 2007; Las Vegas. pp. 1-2.

Wayne Jansen Serban Gavrila and Vlad Korolev: "Proximity Beacons and Mobile Device Authentication: An Overview and Implementation." Jun. 2005; National Institution of Standards and Technology. US Department of Commerce. Abstract, pp. 1-2, 7, 19.

PR Newswire: "Interlink Networks and Bluesoft Partner to Deliver Wi-Fi Location-Based Security Solutions" Apr. 24, 2003. PRNewswire Ann Arbor, Mich. and San Mateo, Calif. p. 1.

Maxmind.com via Archive.org https://www.maxmind.com/MaxMind_minFraud_Overview.pdf: Maxmind MiniFraud. Jan. 3, 2007. pp. 1-2.

"CyberAngel Security Solutions and Skyhook Wireless Announce Groundbreaking New Laptop Recovery System" https://web.archive.org/web/20061230140104/http://www.thecyberangel.com/pr/TheCA_SkyhookPart.pdf (Archived Dec. 30, 2006).

Newbury Networks WiFi Watchdog™; https://web.archive.org/web/20060514083727/http://www.newburynetworks.com/downloads/WifiWatchDog_DataSheet.PDF (Archived May 14, 2006).

(56) References Cited

OTHER PUBLICATIONS

RSA Adaptive Authentication https://web.archive.org/web/20060314143839/http://www.rsasecurity.com/solutions/consumer_authentication/ADAPT_SB_0106.pdf (Archived Mar. 14, 2006).

* cited by examiner

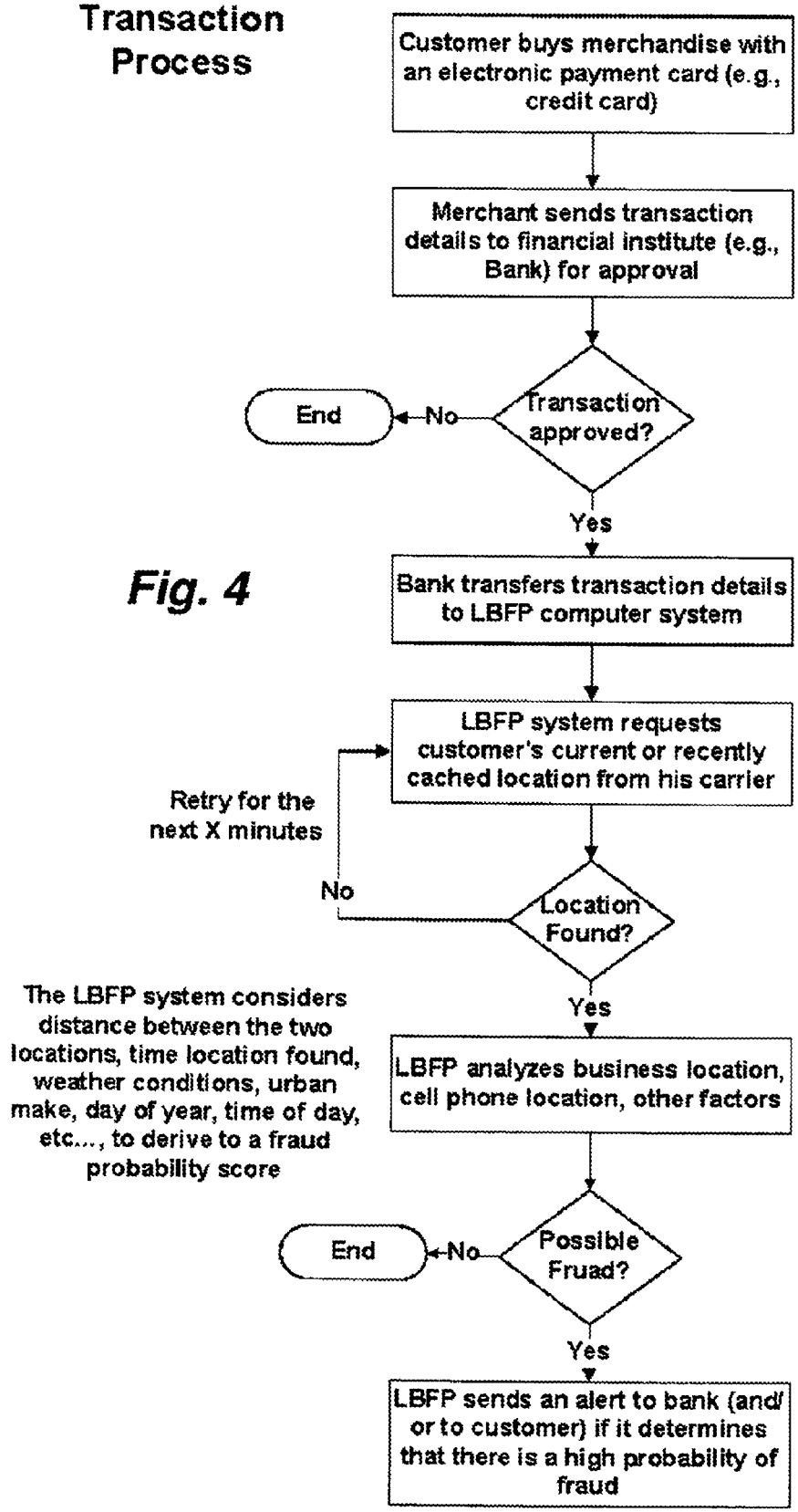

METHOD OF REDUCING FRAUD IN ON-LINE TRANSACTIONS

CROSS-REFERENCE TO RELATED APPLICATIONS

This application is a continuation-in-part of U.S. patent application Ser. No. 15/787,805, filed Oct. 19, 2017, now U.S. Pat. No. 10,521,786, which is a continuation-in-part of U.S. patent application Ser. No. 15/606,270, filed May 26, 2017, now U.S. Pat. No. 10,289,833, which is a continuation-in-part of U.S. patent application Ser. No. 15/134,545, filed Apr. 21, 2016, now U.S. Pat. No. 9,727,867, which is a continuation-in-part of U.S. patent application Ser. No. 14/835,707, filed Aug. 25, 2015, now U.S. Pat. No. 9,391,985, which is a continuation-in-part of U.S. patent application Ser. No. 14/479,266, filed Sep. 5, 2014 and now abandoned, which is a continuation-in-part of U.S. patent application Ser. No. 14/145,862, filed Dec. 31, 2013, now U.S. Pat. No. 9,033,225, which is a continuation-in-part of U.S. patent application Ser. No. 13/479,235, filed May 23, 2012, now U.S. Pat. No. 8,770,477, which is a continuation-in-part of U.S. patent application Ser. No. 13/065,691 filed Mar. 28, 2011, now U.S. Pat. No. 8,640,197, which in turn claims priority of U.S. provisional application No. 61/445,860 filed on Feb. 23, 2011 and U.S. provisional application No. 61/318,329 filed on Mar. 28, 2010.

U.S. patent application Ser. No. 13/065,691 is also a continuation-in-part of U.S. patent application Ser. No. 12/260,065 filed on Oct. 28, 2008 and now abandoned, which is a continuation-in-part of U.S. patent application Ser. No. 11/346,240 filed on Feb. 3, 2006, now U.S. Pat. No. 7,503,489, which in turn claims priority from U.S. provisional application No. 60/674,709, filed Apr. 26, 2005.

U.S. patent application Ser. No. 13/065,691 is also a continuation-in-part of U.S. patent application Ser. No. 12/357,380, filed on Jan. 21, 2009, now U.S. Pat. No. 8,656,458, which is a continuation-in-part of U.S. patent application Ser. No. 11/405,789 filed on Apr. 18, 2006, now U.S. Pat. No. 8,590,007, which in turn claims priority from U.S. provisional application No. 60/711,346 filed on Aug. 25, 2005.

U.S. application Ser. No. 13/065,691 is also a continuation-in-part of U.S. patent application Ser. No. 12/600,808, filed on May 29, 2007, now U.S. Pat. No. 8,370,909, which in turn is a 371 (National Stage in the US) of PCT/US07/012552 filed May 29, 2007.

U.S. application Ser. No. 13/479,235 is also a continuation-in-part of U.S. patent application Ser. No. 13/290,988, filed on Nov. 7, 2011, now U.S. Pat. No. 8,413,898, which in turn is a divisional of U.S. application Ser. No. 12/260,065, supra.

The contents of each one of the above prior applications is incorporated herein by reference in its entirety.

FIELD OF THE INVENTION

This invention relates to a method and system for monitoring electronic purchases.

BACKGROUND OF THE INVENTION

As credit card and debit card purchases have expanded both in number and in the methods by which they can be accomplished, particularly electronic purchases, the opportunity for fraudulent, invalid or unauthorized purchases has increased. The expansion of such purchase opportunities has resulted in an increase in monetary losses to sellers, merchants, financial institutions and authorized holders of the authorized credit card and debit cards. In response, methods and systems have been developed to reduce the number of fraudulent purchases through verification processes and systems.

An example of a method of increasing the security of payments made by credit and cash cards is set forth in U.S. Patent Publication No. 20040073519.

Another example of a method of increasing the security of payments made by credit and cash cards is set forth in U.S. Patent Publication No. 20040254868.

A cellular telephone location system for automatically recording the location of one or more mobile cellular telephones is described, for example, in U.S. Pat. No. 5,327,144. The system comprises a central site system operatively coupled to at least three cell sites. Each of the cell sites receives cellular telephone signals and integrates a timing signal common to all the cell sites. The central site calculates differences in times of arrival of the cellular telephone signals arriving among the cell sites and thereby calculates the position of the cellular telephone producing the cellular telephone signals. Additional examples of known methods for locating phones are cell sector and cell site. The full disclosure of U.S. Pat. No. 5,327,144 is hereby incorporated by reference in its entirety.

The Federal Communications Commission (FCC) has recently mandated wireless Enhanced 911 (E911) rules to improve the effectiveness and reliability of wireless 911 service by providing 911 dispatchers with additional information on wireless 911 calls. According to the FCC website, the wireless E911 program is divided into two part—Phase I and Phase II. Phase I requires carriers, upon appropriate request by a local Public Safety Answering Point (PSAP), to report the telephone number of a wireless 911 caller and the location of the antenna that received the call. Phase II requires wireless carriers to provide far more precise location information, within 50 to 300 meters in most cases. The deployment of E911 requires the development of new technologies and upgrades to local 911 PSAPs, as well as coordination among public safety agencies, wireless carriers, technology vendors, equipment manufacturers, and local wireline carriers. The FCC established a four-year rollout schedule for Phase II, beginning Oct. 1, 2001 and to be completed by Dec. 31, 2005.

SUMMARY OF THE INVENTION

A method for facilitating the detection of misuse of an identity during an electronic transaction. The present invention comprises at least five embodiments. In a first embodiment, the method comprises the steps of: receiving a notification to authenticate the use of an identity at a first location, wherein the identity is associated with a first wireless terminal; determining an approximate location of the first wireless terminal based on cached position information, the approximate location of the first wireless terminal being a second location; determining whether the first and second locations match in geographical proximity; and generating an alert if the first and second locations do not match in geographical proximity. In a second embodiment, an approximate location of the first wireless terminal is determined based on cached position information stored on a GPS position database.

BRIEF DESCRIPTION OF THE DRAWINGS

FIG. 4 shows a non-limiting flow chart of one embodiment of the invention.

Figure 1:
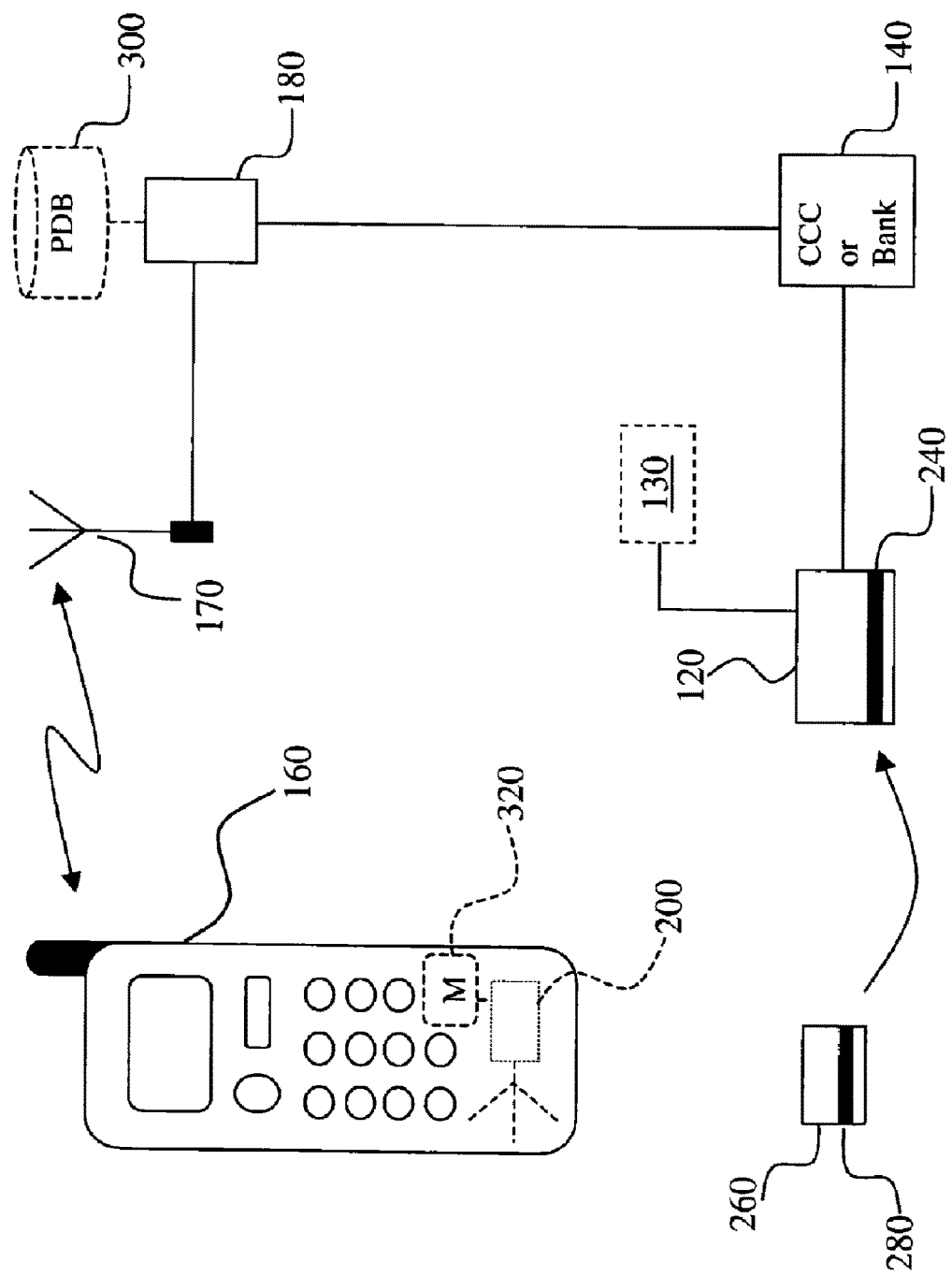
FIG. 1 is a schematic block diagram showing exemplary hardware elements that can enable the practice of the various embodiments of the present invention.

It should be understood that the attached figures are not intended to limit the scope of the present invention in any way.

DETAILED DESCRIPTION OF THE INVENTION

This invention relates to a method and system for monitoring electronic transactions. In general terms, in one aspect of the invention a user identity (such as the user's credit card, cash card, etc.) is associated with a first wireless terminal, e.g., the user's cell phone. The position of the user's cell phone is determined at intervals and cached (i.e., archived) to provide a stream of regularly updated pre-transaction positions. Each cached pre-transaction position can be stored on a remote position database (PDB) or on the user's cell phone. If the user's identity such as the user's credit or cash card is later used, for example, at a point of sale (POS) electronic terminal having a known location (being a first location), the invention detects the use of the user's credit card (i.e., identity) at the first location and compares the first location with the most recent cached position of the user's cell phone (now treated as a pre-transaction position to provide a second location for comparison). Specifically, a determination is made as to whether the first and second locations match in geographical proximity. If the first and second locations do not match in geographical proximity, the invention generates an alert or advisory message that is communicated to a predetermined notification device, such as the user's email account, a POS electronic terminal, a financial institution's computers or offices (such as the user's credit card company's computers, etc.). The alert can also be a reply message for blocking an associated electronic transaction at the first location.

The invention can be adjusted such that as each new pre-transaction position corresponding to the user's cell phone becomes available, the new pre-transaction position can be used to overwrite the currently archived pre-transaction position to prevent illicit or unauthorized tracking of the user's movements.

In another aspect of the invention, if the latest archived pre-transaction location (i.e., second location) and known POS location (i.e., first location) don't match, a post-transaction position (being a third location) of the user's cell phone is obtained and compared to the known first location and an alert generated if the post-transaction location (third location) and known POS location (first location) do not match in geographical proximity. Such matching can be based on a predetermined distance. For example, if the post-transaction location of the user's cell phone is determined to be more than 5 miles from the known POS location, an alert is generated and communicated to a predetermined device such as the user's cell phone and/or email address, and/or to an appropriate financial institution such as the user's bank or a credit card company's computers, the user's wireless personal digital assistant or a user's wireless enabled laptop, etc. Thus, if the actual position of the user's cell phone is not available at about the time of the transaction, the pre or post-transaction position of the user's cell phone can be used to determine if an alert is warranted.

For example, the user's cell phone may include a GPS receiver capable of determining the position of the user's cell phone, but only if the user's GPS capable cell phone is able to receive GPS signals necessary to calculate the location of the user's cell phone. GPS signals are transmitted by dedicated satellites and are often not strong enough to be received inside buildings where many ATM and POS terminals are located. The invention provides a non-obvious way of monitoring the use of one or more identities (such as a credit card or cash card number) associated with a user regardless of the ability of a user's cell phone to pick up GPS signals at the time of transaction (i.e., when the user's identity is used to authorize a transaction).

Specifically, through such monitoring, the invention facilitates the detection of a possible fraudulent or an invalid electronic purchase involving the use of a user's identity, for example, a credit card, debit card or any other kind of electronic payment or purchase system including biometric based purchases. Upon detection of suspect purchase or transaction (such as a cash withdrawal at an ATM), an advisory message is communicated to a predetermined notification device. The intent of this invention is to provide an alert upon detection of an inappropriate purchase or transaction.

The invention is now described in more detail.

It should be understood that the term "wireless terminal" (and its derivatives such as "first wireless terminal"), as used in the context of the present invention, applies to any device capable of communicating with a wireless network or cellular system. A non-limiting example of a first wireless terminal includes a cellular telephone (sometimes referred to as a cell phone or a wireless phone). Other non-limiting examples include any device that has been modified or designed to communicate with a wireless network including, but not limited to: a Personal Digital Assistant ("PDA"), such as a Wi-Fi™ capable PDA, or a wireless Blackberry (such as the Blackberry 7520 model).

The predetermined notification device can be any suitable device capable of receiving communications directly or indirectly from a wireless network, such as, but not limited to: a first mobile terminal, a second mobile terminal, a Personal Digital Assistant (PDA) capable of communicating with a wireless network, a laptop computer capable of communicating with a wireless network, a message server, and an email server, an electronic terminal 120, alone or in combination. An alert sent to an electronic terminal 120 at the first location, wherein the alert prevents a transaction associated with the identity The position of a mobile terminal can be determined by, for example, an internal positioning apparatus and an external position apparatus, alone or in combination. Examples of internal positioning apparatus include a GPS receiver built into the mobile terminal that receives Global Positioning System ("GPS") radio signals transmitted from GPS satellites. The GPS system can be supplemented with an INS (inertial navigation system) also built into the mobile terminal (see FIG. 2).

The external positioning apparatus can be a cellular positioning system that computes the position of the mobile terminal by observing time differences among the arrivals of a radio signal transmitted by the mobile terminal at a plurality of observation points, i.e., base stations, which typically form part of the wireless network. Alternatively, the external positioning apparatus could be a single base station that the mobile terminal is in contact with. Each base station has a particular base station ID and a location associated with the base station ID. Thus, the location of a mobile terminal can be approximated to the actual location of a base station, but given that the typical area covered by a base station is often about one kilometer, it is difficult to accurately determine the position of the mobile terminal.

The role of base stations in wireless networks is described, for example, in "Cellular Radio Systems", published by Artech House, Boston (editors: D. M. Balston and R. C. V. Macario; ISBN: 0-89006-646-9); "Digital Cellular Radio" written by G. Calhoun and published by Artech House, Boston (ISBN: 0-89006-266-8). "Cellular Radio Systems" and "Digital Cellular Radio" are hereby incorporated by reference in their entirety.

The position of a mobile terminal can also be tracked using external RFID tags (Radio Frequency Identification tags) in combination with an RFID reader built into the mobile terminal. How RFID tags and readers work is described in U.S. Patent Publication No. 20050143916 published Jun. 30, 2005 to Kim, In-Jun, et al. U.S. Patent Publication No. 20050143916 is incorporated by reference herein in its entirety.

In a first embodiment of the present invention, a method is provided for facilitating the detection of misuse of an identity during an electronic transaction. The first embodiment comprises the steps of: receiving a notification to authenticate the use of an identity at a first location, wherein the identity is associated with a first wireless terminal; determining an approximate location of the first wireless terminal based on cached position information, the approximate location of the first wireless terminal being a second location; determining whether the first and second locations match in geographical proximity; and generating an alert if the first and second locations do not match in geographical proximity.

The cached position information can be cached GPS position information stored on the first wireless terminal. The step of determining the second location can further comprise the step of updating the cached position information with an inertial navigation system correction performed by the first wireless terminal to provide an updated location of the first wireless terminal, the updated location being the second location.

In one aspect of the first embodiment, the step of determining the second location further comprises the step of detecting whether GPS signals are being received by the first wireless terminal to determine a post-transaction location of the first wireless terminal, the post-transaction location being the second location. The step of detecting whether sufficient GPS signals are being received by the first wireless terminal for the first terminal to determine a post-transaction is only performed if cached position information is not stored on the first wireless terminal or if the cached position information is stale. The cached position information is regarded as stale if the information has not been updated for a predetermined time period, e.g., has not been within the last 30 minutes, 15 minutes or last 5 minutes. The predetermined time period defining when the cached position information is stale can vary and may be factory set or optionally set by the owner or user of the identity.

The first wireless terminal can be any device that can wirelessly communicate with a network, such as a cell phone, which can communicate wirelessly with a wireless network. Examples of suppliers of cell phones are Nokia, Motorola, and Ericsson. The terms "cell" and "cellular" are regarded as equivalent terms.

The identity can be a credit card number, an account number, a debit card identification number, a driver's license number, a name and address, a social security number, a telephone number, a finger print, an iris scan identity, a retina scan identity, and a membership identity (such as a membership password), alone or in combination. The identity can also be any suitable biometric identity, such as a fingerprint, an iris scan identity and a retina scan identity, alone or in combination.

With respect to the notification associated with the use of the identity at the first location, the notification can be generated, for example, by an electronic transaction device (such as a credit card reader at a restaurant, an ATM machine such as a cash-withdrawal terminal that incorporates a card reader) at the first location or by, for example, a credit card company in communication with the electronic device at the first location.

It should be understood that the electronic transaction device could be any suitable device where the identity can be entered for the purpose of performing an electronic transaction. For example, a credit card with a credit card number can be read by the electronic device, and the credit card number communicated to the credit card company associated with the credit card, and in response the credit card company generates a notification, which is routed to the first wireless terminal. In response to receiving the notification, the first wireless terminal determines its location based on cached position information stored on the first wireless terminal or if the cached location information is stale requesting the first wireless terminal to provide a fresh location.

Referring to the invention in general, the generated alert can take any suitable form. For example, the alert can be an advisory message, which is communicated to at least one predetermined device. The at least one predetermined device could be the first wireless terminal and/or a second wireless terminal, wherein the first wireless terminal also acting as the predetermined device could be a cell phone. The predetermined device can be any suitable device, such as a Personal Digital Assistant (PDA) and/or a laptop capable of communicating with a wireless network and/or receiving emails, and a message server. An example of a message server is a server accessible via the world-wide-web (WWW) and which stores messages for downloading by, for example, a wireless capable laptop with authorization to access the message server. The message server could be an email server programmed to store and/or forward emails to subscribers. Other examples of message servers include the hotmail email system and the webmail service provided by Google called Gmail.

Alternatively, the generated alert can be routed to the user's email address recorded during a previous registration of the identity. Alternatively, the alert is a reply message, such as a non-authorization message, for blocking an associated electronic transaction at the first location, and more particularly for blocking a transaction at the first location associated with the identity. It should be understood that the identity may not be limited to one identity, but could encompass one or more identities such as a user's credit card number together with the user's email address, social security number, phone number, residential address or phone number. Thus, a card reader may read a user's credit card and the user asked to enter or otherwise provide their email address or phone number. Some retail outlets routinely ask customers for their home phone number and/or address.

In one aspect of the invention, the use of an identity is associated with a first time stamp. The first time stamp corresponds to the time of the associated electronic transaction (or attempted electronic transaction) performed at a first location, and wherein the step of reading a cached location is associated with a second time stamp. The speed can be calculated based on the distance between the first and second locations and the time difference between the first and second time stamps such that the first and second locations are judged not to match in geographical proximity if the speed is above a predetermined value. Thus, if the speed to travel between the first and second locations is calculated to be about 1000 mph, and the predetermined value is set at 40 mph, an alert would be generated.

In another aspect of the first embodiment, if the first and second locations do not match in geographical proximity, then a confidence score is calculated to determine if the position mismatch with respect to the first and second locations is acceptable or unacceptable, and the alert is only generated if the confidence score is below a predetermined threshold. In addition to the time and distance difference, the system can also use additional factors to derive the confidence score. These factors can be weather conditions, time of day, day of year, urban makeup (e.g. a suburb area versus a downtown area), etc.

In still another aspect of the first embodiment, the step of determining the second location further comprises the step of detecting a Wi-Fi™ Unique ID associated with the position of the first wireless terminal, and converting the Wi-Fi™ unique ID into a post-transaction location for the first wireless terminal, the post-transaction location being the second location, wherein the step of detecting a Wi-Fi™ Unique ID is only performed if cached position information is not stored on the first wireless terminal. For example, if the wireless terminal lacks cached position information and the first wireless terminal is able to detect a Wi-Fi™ unique ID, then the Wi-Fi™ unique ID, which is used to determine the position of the first wireless terminal. This might entail accessing a database that matches a Wi-Fi™'s unique ID (i.e., identity such as, but not limited to, an Internet media-access-control (MAC) address) with known positions corresponding to each Wi-Fi™ unique ID. This database might be stored, for example, on a ≤1.5" hard drive (i.e., a less-than or equal to 1.5 inch hard drive) or on a large capacity memory chip fitted to the first wireless terminal 160.

In still another aspect of the first embodiment, the step of determining the second location further comprises the step of detecting a WiMAX Unique ID associated with the position of the first terminal, and converting the WiMAX Unique ID into a post-transaction location for the first wireless terminal, the post-transaction location being the second location, wherein the step of detecting a WiMAX Unique ID is only performed if cached position information is not stored on the first wireless terminal. Alternatively, the step of detecting a WiMAX Unique ID is only performed if the cached position information is stale, wherein the cached position information is regarded as stale if the information has not been updated for a predetermined time period.

In still another aspect of the first embodiment, the step of determining the second location further comprises the step of obtaining a post-transaction position for the first wireless terminal as soon as the first wireless terminal is able to receive GPS signals to calculate its post-transaction position, the post-transaction position being the second location, wherein the step of obtaining a post-transaction position is only performed if cached position information is not stored on the first wireless terminal.

In still another aspect of the first embodiment, the step of determining the second location further comprises the step of obtaining a post-transaction position for the first wireless terminal as soon as the first wireless terminal is able to receive GPS signals to calculate its post-transaction position, the post-transaction position being the second location, wherein the step of obtaining a post-transaction position is only performed if the cached position information is stale, wherein the cached position information is regarded as stale if the information has not been updated for a predetermined time period.

In a second embodiment of the present invention, a method is provided for facilitating the detection of misuse of an identity during an electronic transaction. The second embodiment comprises the steps of: receiving a notification to authenticate the use of an identity at a first location, wherein the identity is associated with a first wireless terminal; determining an approximate location of the first wireless terminal based on cached position information stored on a GPS position database, wherein the GPS position database is operatively connected to a wireless provider 180 and/or a financial institution's computers 140, the approximate location of the first wireless terminal being a second location; determining whether the first and second locations match in geographical proximity; and generating an alert if the first and second locations do not match in geographical proximity.

In a third embodiment of the present invention, a method is provided for facilitating the detection of misuse of an identity during an electronic transaction, comprising the steps of: receiving a notification to authenticate the use of an identity at a first location, wherein the identity is associated with a first wireless terminal; reading a cached location of the first wireless terminal based on cached position information stored on the first wireless terminal, the location of the first wireless terminal being a second location; determining whether the first and second locations match in geographical proximity; determining a post-transaction location of the first wireless terminal if the first and second locations do not match in geographical proximity, the post-transaction location of the first wireless terminal being a third location; and generating an alert if: (1) the first and second locations do not match in geographical proximity and (2) the first and third locations do not match in geographical proximity.

Referring to the invention in general and with reference to the third embodiment, the post-transaction location can be obtained, for example, by processing GPS signals received by the first wireless terminal 160 within a reasonable time after the transaction (referred to hereinafter as "post-transaction GPS signals"). Post-transaction location can also be obtained, for example, using Wi-Fi™ unique ID (if available) or WiMax unique ID. Alternatively, the post-transaction location can be obtained by using an inertial navigation module (INM) 400 (discussed infra) to convert the most recent cached location into a post-transaction location for the first wireless terminal, wherein updating the most recent cached position of the INM module is integrated into the design of the first wireless terminal (see, e.g., FIG. 3). Thus, the post-transaction location can be determined based on a method selected from the group consisting of: processing post-transaction GPS signals, Wi-Fi™ unique ID, and WiMax unique ID, and any combination thereof.

In a fourth embodiment of the present invention, a method is provided for facilitating the detection of misuse of an identity during an electronic transaction, comprising the steps of: receiving a notification to authenticate the use of an identity at a first location, wherein the identity is associated with a first wireless terminal; reading a cached location of the first wireless terminal based on cached position information stored on the first wireless terminal, the location of the first wireless location being a second location; determining whether the first and second locations match in geographical proximity; determining the post-transaction location of the first wireless terminal if the first and second locations do not match in geographical proximity, the post-transaction location of the first wireless terminal being a third location; determining a post-transaction position of the first wireless terminal if (1) the first and second positions do not match in geographical proximity and (2) it is not possible to determine the post-transaction location, wherein the post-transaction position is treated as the third location; and generating an alert if: (1) the first and second locations do not match in geographical proximity and (2) the first and third locations do not match in geographical proximity.

FIG. 1 is a schematic block diagram showing exemplary hardware elements that can enable the practice of the various embodiments of the present invention. An electronic transaction terminal is shown at 120. The electronic transaction terminal 120 can be, for example, a credit and/or debit card terminal located at a first location such as a point of sale location inside a retail store, i.e., at a known first location. Alternatively, the terminal 120 could be a credit/debit card terminal linked to a cash register (not shown) or the terminal 120 could be a regular ATM (automatic teller machine) for dispensing cash to registered holders of cash cards. In other words, the terminal 120 can take various forms without detracting from the spirit of the present invention. If the first and second locations do not match in geographical proximity, the alert can be a reply message for blocking an associated electronic transaction at the first location.

The terminal 120 is operatively coupled to a financial institution's computers 140 such as a credit card company's computers or a bank's computers if, for example, terminal 120 is an ATM and used for cash withdrawals). The financial institution's computers 140 are those computers authorized to process the user's financial transactions. The financial institution's computers 140 are in turn able to communicate with a first wireless terminal 160 via a wireless provider 180 and, based on signal strength, the nearest base station 170 to the first wireless terminal 160. Examples of credit card companies include Visa, Discover, American Express, MasterCard, and Eurocard. Examples of wireless providers include Sprint, Verizon and T-Mobile.

An optional position database (PDB) 300 can be operatively coupled to the wireless provider 180. Alternatively, PDB 300 can be operatively coupled to the financial institution's computer 140. The PDB 300 can be operatively coupled to more than one element such as wireless provider 180 and financial institution's computers 140. The PDB 300 can be directly or indirectly linked to wireless provider 180 and/or financial institution's computers 140. The terms "coupled" or "operatively coupled" are intended to cover both direct and indirect links. Pre-transaction and/or post-transaction positions with respect to the first wireless terminal 160 can be stored on the PDB 300. The PDB 300 can store positions derived from any known position determination technique such as, but not limited to, GPS position data derived from a GPS receiver 200 located on the first wireless terminal 160 (see, e.g., FIG. 2).

The optional PDB 300 can, for example, archive or cache a position history of the first wireless terminal 160. Thus, if the first wireless terminal 160 is unable to receive GPS signals or is switched off, the optional position database 300 can be accessed to provide the latest available position of the first wireless terminal 160, i.e., in this scenario, the first wireless terminal 160 uploads its position at predetermined intervals to the wireless vendor 180 and thence to the position database 300.

Alternatively, positions based on previously received GPS signals can be stored in a memory 320 integrated with the first wireless terminal 180. The memory 320 can be any suitable memory such as, but not limited to: a RAM chip, a floppy disk, a hard disk drive such as an iPod battery powered 1.8-inch 60 GB hard disk drive or the anticipated 0.85 inch 3 GB hard disc drive, a CD-ROM, and a DVD-ROM, any known memory or anticipated memory option, alone or in combination.

In FIG. 1, the wireless terminal 160 is a cell phone fitted with a GPS receiver 200. The first wireless terminal can also include memory for storing cached positions, i.e., a history of the positions of the first wireless terminal, so that if the wireless terminal is required to supply its post-transaction position but is unable to do so, perhaps because the first wireless terminal is unable to receive GPS signals, then the latest cached position can be used. The first wireless terminal 160 can be a GPS enabled cell phone as shown, or any wireless terminal capable of communication with a wireless provider such as a Blackberry in combination with a GPS receiver.

Still referring to FIG. 1, terminal 120 includes a card reader 240 for reading a credit card 260. An identity in the form of a credit card number and details are stored on a magnetic strip 280 and are read by the card reader 240. It should be understood that the magnetic strip 280 could be replaced with any known or future technology, e.g., a smart chip embedded in a credit or debit card, which can be read by, for example, waving the card near a card reader enabled to so read credit and/or debit cards fitted with smart chips.

At any point after the identity has been read by terminal 120, a notification can be generated by the electronic terminal 120 or other device operatively coupled to the terminal 120, and/or the credit card company's or bank's computers 140. One or more notifications can be generated by, for example, the electronic transaction terminal 120 and the credit card company's or bank's computers 140, alone or in combination. The notification acts as a trigger wherein the post-transaction or cached position of the first wireless terminal 160 (treated as the second position) is determined and compared to the position of the electronic transaction terminal 120 (regarded as the first position). More specifically, a check is made to determine if the first and second positions match in geographical proximity. The task of determining if the first and second positions match in geographical proximity can be done by one or more elements such as, but not limited to, the first wireless terminal 160, the wireless provider 180 and the computers 140, the electronic transaction terminal 120 (or an optional processor 130 operatively coupled to the terminal 120), alone or in combination. If the computers 140, first wireless terminal 160, wireless provider 180, alone or in combination, is/are tasked to determine if the first and second positions match in geographical proximity, then the notification should include data representative of the first position of the electronic transaction terminal 120.

While wireless terminals (e.g., wireless mobile terminals such as cell phones) having a GPS receiver combined with a communication system capable of communicating with a base station are known (e.g., U.S. Pat. No. 5,945,944 describes such a device), the prior art does not teach a method and system for monitoring electronic purchases and cash-withdrawals of the present invention. U.S. Pat. No.

5,945,944, issued Aug. 31, 1999 to N. F. Krasner, is herein incorporated by reference in its entirety.

Figure 2:
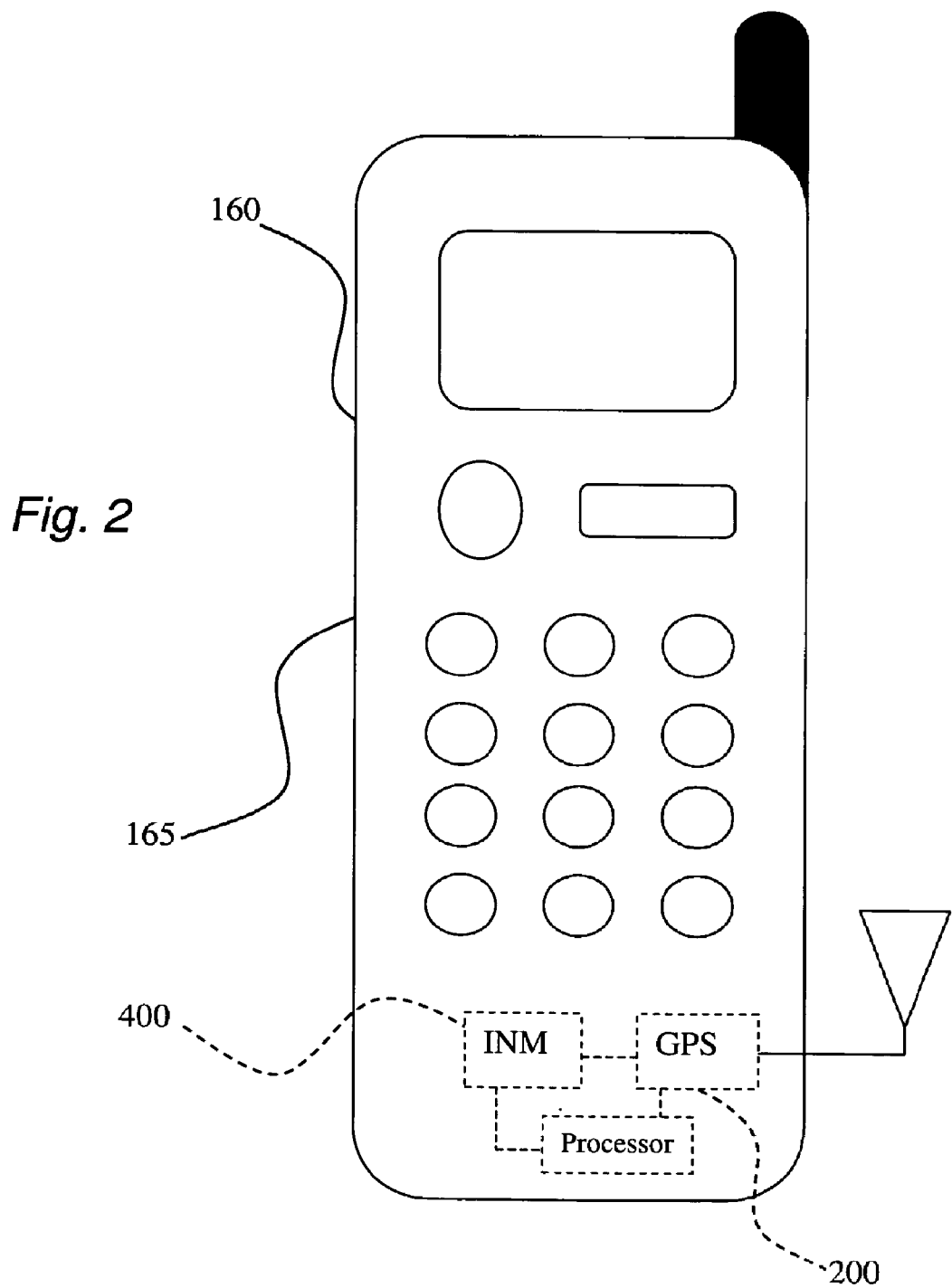
FIG. 2 shows a schematic block diagram of an exemplary first wireless terminal fitted with a GPS receiver operatively coupled to an inertial navigation system according to one aspect of the present invention.

In another embodiment, a GPS receiver 200 operatively coupled to a miniature inertial navigation module (INM) 400. FIG. 2 shows a schematic block diagram of an exemplary first wireless terminal 160 fitted with a GPS receiver 200 operatively coupled to an INM 400. The GPS receiver and INM combination can be housed inside the housing 165 of the first wireless terminal. Suppliers of miniature inertial navigation hardware include Analog Devices Inc. and Comarco, Inc. (and more particularly its subsidiary Comarco Wireless Technologies (CWT) of Irvine, Calif. 92618, USA). CWT miniature inertial modules are capable of precision position measurements in buildings and urban canyons and, when combined with a GPS receiver 200, can determine the position of a first wireless terminal 160 with a high degree of accuracy and reliability.

INM technology in the form of silicon is available, for example, from Analog Devices Inc. (ADI). The ADI ADXL103 (a 5 mm×5 mm×2 mm LCC package), which is a high accuracy, high stability, low cost, low power, complete single axis accelerometer with a signal conditioned voltage output, all on a single monolithic IC. The ADXL213 supplied by ADI is a precision, low power, complete dual axis accelerometer with signal conditioned, duty cycle modulated outputs, on a single monolithic integrated chip (IC) measuring 5 mm×5 mm×2 mm. Also, ADI's ADXL311 is a low cost, low power, complete dual axis accelerometer with signal conditioned voltage outputs, all on a single monolithic IC of dimensions of just 5 mm×5 mm×2 mm. In addition, ADI's ADXRS401 is a low-cost complete ultra small and light (<0.15 cc, <0.5 gram) angular rate-sensing gyroscope capable of measuring up to 75 degrees per second with all of the required electronics on a single chip.

Working Example

Figure 3:
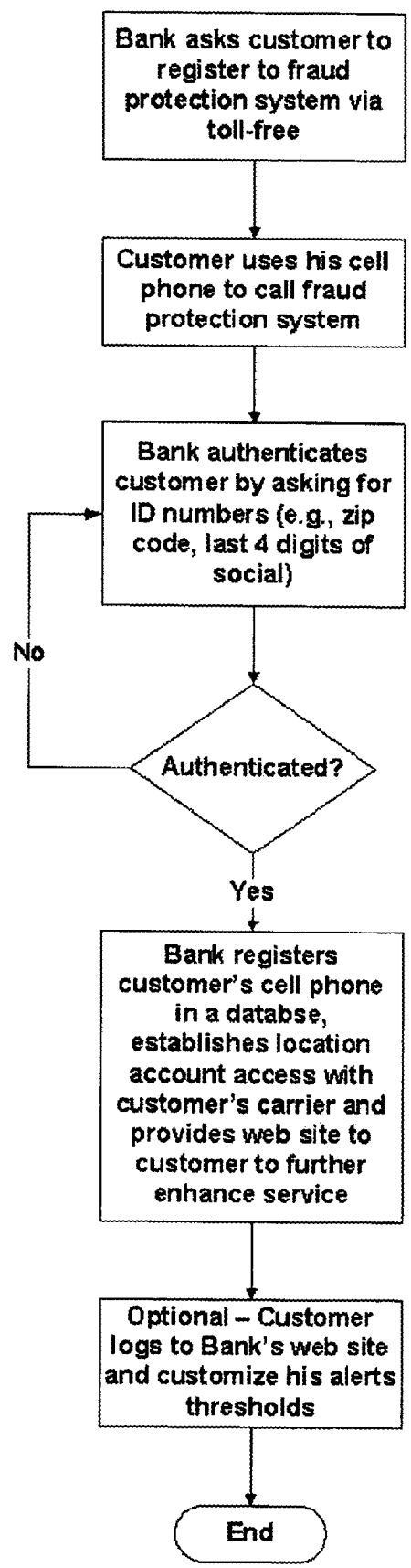
FIG. 3 shows a non-limiting example of a user registration process according to one aspect of the present invention.

The following is a non-limiting working example of a fifth embodiment of the present invention. A credit card customer agrees to be locatable via his or her mobile phone provider and registers a credit card or debit card (hereinafter "credit card") in such a manner that the user's credit card is associated with at least one mobile terminal. The process of registering a credit card in a Location-Based Fraud Protection ("LBFP") System involves a financial institution which partners with one or more mobile phone or wireless providers that provide mobile geographical location(s). A mobile phone provider agrees, usually for a fee, to release the location of a subscriber who, in order to comply with privacy laws, authorizes this action. The financial institution, using the LBFP system, can register its clients using the following method (as shown in FIG. 3): sending a letter or calling the client, and requesting the client to call a toll-free number from his cell phone. Using the caller's ID, the LBFP system will require at least two identifying numbers. These identifying numbers can be the last 4 digits of the credit card and the home address zip code. Once the customer enters these numbers, the LBFP system will communicate these details to the client's financial institution for verification. For added security, the LBFP system can also challenge the client by sending a 4-digit SMS random number to the cell phone and asking the client to enter it using his phone keypad. If verified, the LBFP system will be able to associate the correct credit card with the customer's cell phone number. The LBFP system will then check to see if the client's cell phone carrier participates in this program. If it does, the LBFP will successfully add the client to its database (as described in the next paragraph) for credit card transaction monitoring. The LBFP system can then provide an optional unique PIN to the client so that he can access the LBFP web site to further custom the alerting logic. In turn, this customization can further increase the accuracy of the LBFP system. For example, the client can add known locations to be used when an online transaction takes place. Known locations can be a work address, relative/friend's address, etc. Using these addresses will increase the LBFP accuracy when a customer uses a credit card online by comparing known locations with client's cell phone location at the approximate time of the online transaction.

The financial institution stores in a database the subscriber customer (hereinafter "subscriber") details. For example, the subscriber's first and last name (stored as a type UTF-8 characters), Mobile carrier/Wireless provider code (e.g., Sprint-1, Nextel-2) stored as type Integer number, 10-digit Mobile phone number (3-digit area code and 7-digit phone number, stored as type Integer number), and ID number that is associated with the financial institution's subscriber's ID number (stored as type Integer number), such cross-reference number acting as a security measure whereby no personal information (SSN, credit card number) is stored in such database.

After registration, each time a subscriber uses the credit card, at the time of a purchase transaction or near to that time, the financial institution will contact the LBFP System servers via a secure encryption link (e.g., SSL/SSH/VPN. With no personal information of the subscriber being transmitted, the financial institution provides the date of transaction, time of transaction, address of the business where the transaction took place, type of transaction (online or physical) and the subscriber's ID number. The LBFP servers will then initiate a request via secure TCP/IP link (e.g., SSL/SSH/VPN) to the subscriber's mobile phone provider requesting the subscriber's post-transaction location, heading and/or speed (see FIG. 4). The actual physical location of the LBFP System does not matter. The LBFP System can be located on the financial institution's premises or at a distance therefrom. If at a distance from the LBFP System, the financial institution can be linked to it via a secure network link (e.g. VPN/SSh/SSL).

When the client uses his or her credit card, the LBFP System receives the purchase information from the financial institution, it cross-references the identifying item from the financial institution with the subscriber's unique carrier ID (e.g., cell phone number).

After the LBFP System finds the subscriber's unique carrier ID (or related information), it will then request the subscriber's last known location from the subscriber's carrier. Each carrier has specific means for interfacing with and providing this information. It is sometimes called API, which are known programming methods to execute specific functions. As a practical matter, the LBFP System, or the financial institution, will create a relationship and interface with the carrier ahead of time in order to obtain this information electronically. The LBFP System can interface with multiple carriers and multiple financial institutions.

There are at least four (4) possible outcomes from the application of the above procedure, namely, (1) unable to locate the cell phone (cell phone out or range, turned off, or other reason that the cell phone cannot be located), (2) able to locate the cell phone—the cell phone is not at home, work or other known location, (3) able to locate the cell phone—the cell phone is at home, work or other known location, the "known location" being the location, in addition to client's home address, where the client usually resides (i.e., work, family addresses), these locations are optional and normally would be entered by the client at registration (see registration process above for more details), (4) able to locate phone with a timestamp prior to the purchase/transaction time.

With respect to each of the at least three (3) possible outcomes, a decision (score) table is created using at least the parameters: $\Delta D$=distance between Location of Mobile phone and Location of Purchase Point, and $\Delta T$=difference between Time located phone and Time of transaction, among potential parameters. The LBFP system may use additional factors to arrive at a final score/Fraud Confidence Level ("FCL"). These factors include a client's heading, speed, urban type/density, time of day, day of week, weather conditions, etc. As to $\Delta D$, the time can range from 0 to 30 kilometers or more. As to $\Delta T$, the time can range from 0 to 30 minutes or more. Depending upon the sensitivity desired for questioning whether a credit card purchase is valid, Fraud Confidence Level ("FCL") values are assigned within the LBFP System for each credit card transaction. When an FCL is calculated by the LBFP System to be above a threshold value, a flag will be raised as to a valid transaction. Alternatively, when an FCL is calculated by the LBFP System to be below a threshold value, a flag is raised as to a potentially fraudulent credit card use.

For example, in the case of outcome (1), if the wireless provider is unable to locate the cell phone (no coverage, turned off, etc.), the LBFP System will switch into "search mode" as follows: (a) the system will keep attempting to locate the cell phone every 10 minutes for the next 30 minutes, or (b) if the location is determined within 30 minutes after the purchase transaction took place, the LBFP system will calculate the distance between the purchase location and the mobile phone location using an exemplar Table 1 to determine an FCL.

TABLE 1 scoring example

| If the location of cell phone is within a distance (Km) of the purchase point and within 20 minutes of the transaction | The LBFP System tags the transaction with an FCL of |
|---|---|
| ½ | 3 |
| 1 | 4 |
| 5 | 5 |
| 10 | 6 |
| 15 | 7 |
| 20 | 8 |
| 25 | 9 |
| >30 | 10 |

In the case of outcome (2)—if the LBFP System was able to locate the cell phone, though the cell phone is not at home, namely, the location of the cell phone was found within 10 minutes after the purchase transaction took place and the purchase type is physical (not online/internet), the LBFP System will calculate the distance between the purchase location or sale point and the mobile phone location using an exemplar Table 2 to determine an FCL.

TABLE 2 scoring example

| If the location of cell phone is within a distance (Km) of the purchase point and within 10 minutes of the transaction | The LBFP System tags the transaction with an FCL of |
|---|---|
| ½ | 3 |
| 1 | 4 |
| 5 | 5 |
| 10 | 8 |
| >10 | 10 |

In the case of outcome (3)—the LBFP System will calculate the distance difference between the customer's known home, work or other known address and the location of the cell phone. If the LBFP System was able to locate the cell phone with the cell phone being at the above known locations, within 10 minutes after the purchase transaction took place AND the purchase type is online/internet, the LBFP System will calculate the distance between the above known locations and the mobile phone location using an example Table 3 to determine an FCL.

TABLE 3 scoring example

| If the location of cell phone is within a distance (Km) of the purchase point and within 10 minutes of the transaction | The LBFP System tags the transaction with an FCL of |
|---|---|
| ½ | 4 |
| 1 | 5 |
| 5 | 6 |
| 10 | 8 |
| >10 | 19 |

In the case of outcome (4)—a customer purchased goods or service from a physical location (e.g., store) and the LBFP System is unable to locate the cell phone. There may be situations whereby the wireless provider was able to acquire the customer's location prior to the purchase and store it in a temporary database. If the timestamp is close to the purchase time and the LBFP system is unable to get a newer location fix, then, in that case, the LBFP system may use the cached location information and $\Delta T$ to calculate the FCL using a scoring table similar to table 1. The cached location information can be either the location information stored on the location server or on the MT.

In addition to the above data, the LBFP system may use additional factors in order to calculate the LFC/fraud score. These factors may be: time of day, day of the week, urban make (a suburb vs. downtown), weather conditions and traffic condition, among others. This is true for all possible scenarios.

With respect to an online purchase, such as a purchase from the online company Amazon.com™, the LBFP System may either know in advance, or at the time of the purchase, the frequent or usual address of the purchaser, for instance, home, work or other known location. The configuration and customization can be defined both globally as a system-wide rule and on per individual basis when the subscriber registered for this service. Customization can include scoring/LFC threshold, known locations, and client notification methods (e.g., SMS, email).

In the case of wireless network, GPS enabled cellular phones require, for the most part, a clear line of site with the sky in order to acquire GPS location. Since that does not always happen (in case the cellular phone is in the subway or other obstructed location), the location of the cellular phone sometimes does not match the exact location of the business. That is the reason the LBFP System compares both locations within a radius of X miles from such locations. (The number of X miles will be determined once an LBFP System in a particular environment has been through beta testing and becomes operational.) The X miles factor is also expected to vary in various geographical locations, such as rural locations versus large cities. Note also that there are cellular phones that can be located with means other than GPS. An example is the triangulation of the cellular phone's signals with surrounding cell towers. To the LBFP System, the manner by which the carrier obtains the mobile phone's location does not matter. The LBFP System will take into account parameters provided by the carrier such as heading, speed, acquisition-time and location error (accuracy).

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

We claim:

1. A method for authentication of an electronic transaction at a first location using a cached location of a mobile phone associated with an Internet user, comprising the steps of:
   (A) receiving the first location and a time stamp associated with the first location;
   (B) obtaining the cached location and a time stamp associated with the cached location, wherein the cached location and the associated time stamp are stored within the mobile phone;
   (C) calculating the difference in time ($\Delta T$) between the time stamp associated with the cached location and the time stamp associated with the first location;
   (D) determining a distance ($\Delta D$) between the cached location and the first location;
   (E) calculating the speed required to travel distance $\Delta D$ in elapsed time $\Delta T$; and
   (F) if the speed required to travel the distance $\Delta D$ in time $\Delta T$ is greater than a predetermined value, then either:
      (i) declining to validate the Internet transaction; or
      (ii) generating an alert.

2. The method of claim 1 further comprising, prior to step (B), the step of requesting and receiving, via the mobile phone, the Internet user's authorization to use the mobile phone location.

3. The method of claim 2, further comprising the steps of:
   (i) receiving inertial navigation information provided by an inertial navigation module within the mobile phone; and
   (ii) determining an updated location of the mobile phone by using the inertial navigation information and the cached location.

4. The method of claim 2, further comprising, prior to step (C), the step of determining if the cached location and the associated cached time stamp are stale; wherein the cached location and the associated cached time stamp are used in steps (C), (D), (E), and (F) only if they are not stale.

5. The method of claim 2, further comprising the steps of:
   (i) receiving inertial navigation information provided by an inertial navigation module within the mobile phone;
   (ii) determining an updated location of the mobile phone by using the inertial navigation information and the cached location;
   (iii) determining whether the updated location and the first location match in a geographical proximity; and
   (iv) generating an alert if the updated location and the first location do not match in the geographical proximity.

6. The method of claim 1, further comprising the step of validating the transaction if the speed required to travel the distance $\Delta D$ between the cached location and the first location in time $\Delta T$ is not greater than the predetermined value.

7. The method of claim 1, further comprising the steps of:
   (i) obtaining a second location of the mobile phone;
   (ii) compering the first location and the second location of the mobile phone for a geographical proximity; and
   (iii) generating an alert if the second location of the mobile phone and the first location do not match in the geographical proximity;
   wherein said second location of the mobile phone, and a time stamp associated with the second location, are stored within the mobile phone.

8. The method of claim 1, further comprising the steps of:
   (i) receiving inertial navigation information provided by an inertial navigation module within the mobile phone;
   (ii) determining an updated location of the mobile phone by using the inertial navigation information and the cached location;
   (iii) determining whether the updated location and the first location match in geographical proximity; and
   (iv) generating an alert if the updated location and the first location do not match in geographical proximity.

9. A method for authentication of an electronic transaction at a first location using a fresh location of a mobile phone associated with an Internet user, comprising the steps of:
   (A) receiving the first location and a time stamp associated with the first location;
   (B) obtaining a fresh location of the mobile phone and a time stamp associated with the fresh location, wherein the fresh location and the time stamp associated with the fresh location are stored within the mobile phone;
   (C) calculating the difference in time ($\Delta T$) between the time stamp associated with the fresh location and the time stamp associated with the first location;
   (D) determining a distance ($\Delta D$) between the fresh location and the first location;
   (E) calculating the speed required to travel distance $\Delta D$ in elapsed time $\Delta T$; and
   (F) if the speed required to travel the distance $\Delta D$ in time $\Delta T$ is greater than a predetermined value, then either:
      (i) declining to validate the transaction; or
      (ii) generating an alert.

10. The method of claim 9 further comprising, prior to step (B), the step of requesting and receiving, via the mobile phone, the Internet user's authorization to use the mobile phone location.

11. The method of claim 9 further comprising the steps of:
    (i) obtaining a cached location of the mobile phone, and inertial navigation information from an inertial navigation module within the mobile phone; and
    (ii) determining an updated location of the mobile phone using the inertial navigation information and the cached location;
    (iii) determining whether the updated location and the first location match in a geographical proximity; and
    (iv) generating an alert if the updated location and the first location do not match in the geographical proximity;
    wherein the cached location and the time stamp associated with the cached location are stored within the mobile phone.

12. The method of claim 9, further comprising the steps of:
(i) prior to step (B), requesting and receiving, via the mobile phone, the Internet user's authorization to use the mobile phone location;
(ii) obtaining a cached location of the mobile phone, and inertial navigation information from an inertial navigation module within the mobile phone;
(iii) determining an updated location of the mobile phone using the inertial navigation information and the cached location;
(iv) determining whether the updated location and the first location match in a geographical proximity; and
(v) generating an alert if the updated location and the first location do not match in the geographical proximity;
wherein the mobile phone store said cached location and a time stamp associated with the cached location.

13. The method of claim 9, further comprising the steps of:
prior to step (B), requesting and receiving, via the mobile phone, the Internet user's authorization to use the mobile phone location; and
(G) validating the transaction if the speed required to travel the distance $\Delta D$ between the fresh location and the first location in time $\Delta T$ is not greater than the predetermined value.

14. The method of claim 9, wherein the alert comprises at least one of: a message to the user's cell phone, and a non-authorization message for blocking the transaction; and further comprising
(G) validating the transaction if the speed required to travel the distance $\Delta D$ between the fresh location and the first location in time $\Delta T$ is not greater than the predetermined value.

15. The method of claim 9, further comprising the steps of:
(i) obtaining a second location of the mobile phone;
(ii) compering the second location of the mobile phone and the first location for a geographical proximity; and
(iii) generating an alert if the second location of the mobile phone and the first location do not match in the geographical proximity;
wherein the second location and the time stamp associated with the second location are stored within the mobile phone.

16. A method for authentication of an electronic transaction at a first location using a location of a mobile phone associated with an Internet user, comprising the steps of:
(A) receiving the first location and a time stamp associated with the first location;
(B) obtaining a first mobile phone location and a time stamp associated with the first mobile phone location, wherein the mobile phone store the first mobile phone location and the associated time stamp with the first mobile phone location;
(C) determining that the first mobile phone location is stale;
(D) obtaining a fresh location of the mobile phone and a time stamp associated with the fresh mobile phone location, wherein the mobile phone store the fresh mobile phone location and the associated time stamp with the fresh mobile phone location;
(E) calculating the difference in time ($\Delta T$) between the time stamp associated with the first location received at step (A) and the time stamp associated with the fresh mobile phone location obtained at step (D);
(F) determining a distance ($\Delta D$) between the fresh mobile phone location obtained at step (D) and the first location received at step (A);
(G) calculating the speed required to travel distance $\Delta D$ in elapsed time $\Delta T$; and
(H) if the speed required to travel the distance $\Delta D$ in time $\Delta T$ is greater than a predetermined value, then either:
(i) declining to validate the Internet transaction; or
(ii) generating an alert.

17. The method of claim 16, further comprising, prior to step (B), the step of requesting and receiving, via the mobile phone, the Internet user's authorization to use the mobile phone location.

18. The method of claim 17, further comprising the step of:
(G) validating the transaction if the speed required to travel the distance $\Delta D$ between the fresh location obtained at step (D) and the first location received at step (A) in time $\Delta T$ is not greater than the predetermined value.

19. The method of claim 18, wherein the alert comprises at least one of: a message to the user's cell phone, and a non-authorization message for blocking the transaction.

* * * * *

UNITED STATES PATENT AND TRADEMARK OFFICE
CERTIFICATE OF CORRECTION

| | |
|---|---|
| PATENT NO. | : 11,308,477 B2 |
| APPLICATION NO. | : 16/724361 |
| DATED | : April 19, 2022 |
| INVENTOR(S) | : Guy Hefetz, Jaqcob Heffez and Christopher Wood |

Page 1 of 1

It is certified that error appears in the above-identified patent and that said Letters Patent is hereby corrected as shown below:

In the Claims

Claim 1, Line 42: "Internet" should read -- electronic --

Claim 7, Line 10: "compering" should read -- comparing --

Claim 12, Line 17: "store" should read -- stores --

Claim 14, Line 30: after "comprising" insert -- the step of --

Claim 15, Line 38: "compering" should read -- comparing --

Claim 16, Line 8: "store" should read -- stores --

Claim 16, Line 15: "store" should read -- stores --

Claim 16, Line 29: "Internet" should read -- electronic --

Claim 19, Line 43: "phone," should read -- phone --

Signed and Sealed this
Sixth Day of August, 2024

Katherine Kelly Vidal
*Director of the United States Patent and Trademark Office*